(12) United States Patent
Ochi et al.

(10) Patent No.: US 9,421,654 B2
(45) Date of Patent: Aug. 23, 2016

(54) CLAMPING DEVICE HAVING RING SHAPE WITH HYDRAULICALLY DOWN FORCE CLAMPING MEANS

(75) Inventors: Masashi Ochi, Tokyo (JP); Yoshikoto Yanase, Tokyo (JP)

(73) Assignee: MITSUBISHI HEAVY INDUSTRIES MACHINE TOOL CO., LTD., Shiga (JP)

( * ) Notice: Subject to any disclaimer, the term of this patent is extended or adjusted under 35 U.S.C. 154(b) by 498 days.

(21) Appl. No.: 13/824,824

(22) PCT Filed: Sep. 15, 2011

(86) PCT No.: PCT/JP2011/071082
§ 371 (c)(1),
(2), (4) Date: May 17, 2013

(87) PCT Pub. No.: WO2012/053300
PCT Pub. Date: Apr. 26, 2012

(65) Prior Publication Data
US 2013/0228960 A1      Sep. 5, 2013

(30) Foreign Application Priority Data
Oct. 21, 2010  (JP) .................................. 2010-236422

(51) Int. Cl.
*B23F 23/08*    (2006.01)
*B23F 23/06*    (2006.01)
(Continued)

(52) U.S. Cl.
CPC ................ *B23Q 3/082* (2013.01); *B23F 23/06* (2013.01); *B23F 23/08* (2013.01); *B23Q 3/062* (2013.01)

(58) Field of Classification Search
CPC ...... B23B 31/025; B23B 31/19; B23B 39/22; B23B 31/4073; B23B 31/30; B23B 31/204; B23F 23/06; B23F 23/08; B23F 23/1243; B23F 23/1212; B23Q 3/062; B23Q 3/082; B25B 1/2421; Y10T 279/12; Y10T 279/1249; Y10T 279/27; Y10T 279/3481; Y10T 29/49998; Y10T 29/53543
USPC ............................ 269/27, 22, 30, 33; 279/141
See application file for complete search history.

(56) References Cited

U.S. PATENT DOCUMENTS 1,021,011 A  *  3/1912  Sponable ........................ 279/69
1,110,396 A  *  9/1914  Marks ................... B23B 31/025
                                                            279/101

(Continued)

FOREIGN PATENT DOCUMENTS

CN          201446409 U      5/2010
JP          48-71487 C       9/1973

(Continued)

OTHER PUBLICATIONS

Chinese Office Action dated Jul. 25, 2014 for corresponding Chinese Application No. 201180046283.8 with an English translation.

*Primary Examiner* — Joseph J Hail
*Assistant Examiner* — Arman Milanian
(74) *Attorney, Agent, or Firm* — Birch, Stewart, Kolasch & Birch, LLP

(57) ABSTRACT

Provided is a clamping device having improved safety and an improved clamping force for clamping a work to an attaching table, said work having the inner circumferential surface thereof to be processed. The clamping device clamps a work (101) disposed on the reference surface (32) of an attaching table (30). The clamping device is provided with: a board-like fixing member (10), which has formed therein a hole (11*a*) that is larger than the inner diameter (D1) of the work (101) but smaller than the outer diameter (D2) of the work, and which is in surface-contact with the end surface (101*a*) of the work (101) disposed on the reference surface (32) of the attaching table (30); and a pressing force applicator (20), which has a cylindrical shape that surrounds the attaching table (30), and which applies a pressing force toward the end surface (101*a*) of the work (101) with respect to the fixing member (10).

4 Claims, 4 Drawing Sheets

(51) Int. Cl.
*B23Q 3/08* (2006.01)
*B23Q 3/06* (2006.01)

(56) References Cited

U.S. PATENT DOCUMENTS

| | | | | |
|---|---|---|---|---|
| 1,401,192 A * | 12/1921 | Runge | B23B 31/19 | 279/8 |
| 1,443,651 A * | 1/1923 | Runge | B23B 31/19 | 279/141 |
| 1,476,434 A * | 12/1923 | Weibull | B23B 31/19 | 279/141 |
| 1,685,235 A * | 9/1928 | Kempton et al. | | 279/136 |
| 2,018,088 A * | 10/1935 | Poock | B23B 31/025 | 279/106 |
| 2,443,895 A * | 6/1948 | Day | B23B 31/025 | 279/106 |
| 2,635,395 A * | 4/1953 | Arms et al. | | 451/244 |
| 2,696,986 A * | 12/1954 | Grobey | B23B 31/30 | 279/106 |
| 2,706,369 A * | 4/1955 | Dix | B24B 5/355 | 451/332 |
| 2,754,641 A * | 7/1956 | Bidwell | B24B 41/061 | 279/141 |
| 2,852,263 A * | 9/1958 | Hohwart | B23B 31/025 | 279/138 |
| 2,861,402 A * | 11/1958 | Okenfuss | B24B 45/00 | 408/95 |
| 2,889,668 A * | 6/1959 | Gluchowicz | B24B 41/061 | 451/397 |
| 2,951,320 A * | 9/1960 | Menard | B23B 31/30 | 451/397 |
| 2,981,037 A * | 4/1961 | Terp | | 451/47 |
| 3,056,238 A * | 10/1962 | Hahn | B24B 41/061 | 451/244 |
| 3,079,736 A * | 3/1963 | Kratt | B24B 13/005 | 279/8 |
| 3,273,292 A * | 9/1966 | Seidel | | 451/397 |
| 3,554,081 A * | 1/1971 | Haley | | 409/132 |
| 3,789,472 A * | 2/1974 | Pegard | | 483/31 |
| 3,813,820 A * | 6/1974 | Highberg et al. | | 451/262 |
| 3,973,764 A * | 8/1976 | Holzer, Jr. | B23Q 3/062 | 269/26 |
| 4,307,954 A * | 12/1981 | Ludwig | G03B 17/14 | 359/828 |
| 4,312,513 A * | 1/1982 | Swenson | B23B 31/025 | 279/136 |
| 4,659,203 A * | 4/1987 | Niwa | G03B 17/14 | 359/828 |
| 4,730,420 A * | 3/1988 | Stratmann | B23B 39/22 | 269/258 |
| 4,733,458 A * | 3/1988 | Benfer | B21B 31/07 | 29/282 |
| 4,887,350 A * | 12/1989 | Hopwood | B65G 47/90 | 269/238 |
| 4,955,763 A * | 9/1990 | Delventhal | B23B 31/204 | 125/20 |
| 4,965,924 A * | 10/1990 | Santandrea | H02K 15/00 | 198/465.1 |
| 5,188,278 A * | 2/1993 | Amao | B23K 20/129 | 228/114 |
| 5,251,510 A * | 10/1993 | Trim et al. | | 82/1.11 |
| 5,403,057 A * | 4/1995 | Sugito | B25B 1/2421 | 269/266 |
| 5,429,376 A * | 7/1995 | Mueller | B23B 31/204 | 279/132 |
| 5,901,624 A * | 5/1999 | Shiramasa | B23Q 5/40 | 269/14 |
| 6,173,971 B1 * | 1/2001 | Shen | B23B 31/204 | 279/121 |
| 8,087,675 B2 * | 1/2012 | Korson | B23B 31/003 | 279/121 |

FOREIGN PATENT DOCUMENTS

| | | |
|---|---|---|
| JP | 7-27056 Y2 | 6/1995 |
| JP | 2001-47337 A | 2/2001 |
| JP | 2006-150514 A | 6/2006 |
| JP | 4288124 B2 | 7/2009 |
| JP | 2010-194635 A | 9/2010 |
| JP | 2010-194636 A | 9/2010 |

* cited by examiner

CLAMPING DEVICE HAVING RING SHAPE WITH HYDRAULICALLY DOWN FORCE CLAMPING MEANS

TECHNICAL FIELD

The present invention relates to a clamping device configured to clamp a workpiece to a mount table, and particularly to a clamping device suitable for use in finishing an inner circumferential surface of a workpiece by grinding.

BACKGROUND ART

To improve gear accuracy, an internal-gear workpiece having undergone a heat treatment is secured to a mount table, and the tooth surface of the internal-gear workpiece in this state is finished by grinding. Examples of a method for securing the internal-gear workpiece include a method in which an outer circumferential surface of the internal-gear workpiece is clamped and a method in which an end surface of the internal-gear workpiece is clamped (see, for example, Patent Document 1).

As the method in which the outer circumferential surface of the internal-gear workpiece is clamped, there is a method using a collet or multiple claw portions. In the method using a collet, a workpiece is placed on an upper surface of a mount table, and a collet is arranged to hold the outer circumferential surfaces of the workpiece and the mount table. Then, the collet is drawn downward to forcibly reduce the diameter of the collet near the upper end thereof. Thus, the workpiece is held at the entire circumference of its outer circumferential surface, and is secured to the mount table. In the method using multiple claw portions, a workpiece is placed on an upper surface of a mount table, and the multiple claw portions are pressed against an outer circumferential surface of the workpiece. Thus, the workpiece is held at its outer circumferential surface, and is secured to the mount table.

Examples of the method in which the end surface of an internal-gear workpiece is clamped include a method using fingers or arms. In the method using fingers, a workpiece is placed on an upper surface of a mount table, and multiple fingers are turned vertically to press tip end portions of the fingers against an end surface of the workpiece. Thus, the workpiece is held at its end surface, and is secured to the mount table. In the method using arms, a workpiece is placed on an upper surface of a mount table, and multiple arms are turned horizontally to place tip end portions of the arms on an end surface of the workpiece, and base end portions of the arms are drawn downward. Thus, the workpiece is held at its end surface, and is secured to the mount table.

PRIOR ART DOCUMENT

Patent Document

Patent Document 1: Japanese Examined Utility Model Registration Application Publication No. Hei 7-27056 (see, for example, [FIG. 1] and the like)

SUMMARY OF THE INVENTION

Problems to be Solved by the Invention

High-speed spinning of a mount table (workpiece) is under consideration in view of improving work efficiency in grind finishing. However, in the above-described methods of clamping the outer circumferential surface of the workpiece, a centrifugal force acts on the jig (the collet or multiple claw portions) to weaken the binding force on the workpiece. Accordingly, the speed of spinning the mount table (workpiece) cannot be increased more than a certain speed. In the method of clamping the end surface of the workpiece, the clamping force can be enhanced by increasing the number of fingers or arms, but the size of the device increases accordingly. Thus, there is a limit on the enhancement of the clamping force. Moreover, in the method of clamping the workpiece by use of the claw portions, fingers, or arms, if the jig (the claw portions, fingers, or arms) is broken or if a fixture securing the jig is loosened, the jig might possibly fly apart. For this reason, safety improvement is demanded.

Accordingly, the present invention has been made to solve the above problems, and has an objective to provide a clamping device in which a clamping force for clamping a workpiece, whose inner circumferential surface is to be machined, to a mount table is improved, and also safety is improved.

Means for Solving the Problems

To solve the above problems, a clamp device according to a first invention is a clamping device configured to clamp a workpiece placed on a reference surface of a mount table, characterized in that the clamping device includes: a plate-shaped securing member in which an opening portion is formed and which comes into surface contact with an end surface of the workpiece placed on the reference surface of the mount table, the opening portion being larger than an inner diameter of the workpiece and smaller than an outer diameter of the workpiece; and pressing-force applying means for applying a pressing force to the securing member toward the end surface of the workpiece, the pressing-force applying means having a cylinder shape surrounding the mount table.

To solve the above problems, a clamp device according to a second invention is the clamp device according to the first invention, characterized in that the pressing-force applying means is attached to the mount table.

To solve the above problems, a clamp device according to a third invention is the clamp device according to the second invention, characterized in that a hydraulic chamber capable of supplying and discharging hydraulic oil is formed by a protrusion portion provided to an inner circumferential portion of the pressing-force applying means and by a groove portion which is formed at an outer circumferential portion of the mount table and into which the protrusion portion of the pressing-force applying means is fitted.

To solve the above problems, a clamp device according to a fourth invention is the clamp device according to the third invention, characterized in that the securing member and the pressing-force applying means are coupled to each other by a bayonet mechanism.

To solve the above problems, a clamp device according to a fifth invention is the clamp device according to the fourth invention, characterized in that the clamping device further comprises transport means for transporting the securing member.

To solve the above problems, a clamp device according to a sixth invention is the clamp device according to the fifth invention, characterized in that the transport means includes a support table configured to support the securing member, and moving means for moving the support table upward and downward.

To solve the above problems, a clamp device according to a seventh invention is the clamp device according to the sixth invention, characterized in that the clamping device further comprises phase adjustment means for adjusting a phase of the securing member, and the phase adjustment means includes a piston rod provided to the support table, capable of moving toward and away from the securing member, and capable of being fitted into a recessed portion formed at an outer circumferential surface of the securing member.

Effect of the Invention

The clamping device according to the present invention includes: the plate-shaped securing member in which the opening portion is formed, the opening portion being larger than the inner diameter of the workpiece and smaller than the outer diameter of the workpiece; and pressing-force applying means which has a cylinder shape surrounding the mount table and is configured to apply a pressing force to the securing member toward the end surface of the workpiece. During the work, a tool is inserted into the area surrounded by the inner circumferential portion of the workpiece. Accordingly, even when the securing member or the pressing-force applying means is broken, the securing member or the pressing-force applying means can be prevented from flying out. Thus, safety can be improved. In addition, the workpiece can be secured to the mount table by bringing the securing member into surface contact with the end surface of the workpiece. Accordingly, a clamping force for clamping the workpiece to the mount table can be improved, compared to the conventional clamping device configured to use claw portions to apply a pressing force toward the outer circumferential surface of a workpiece or the conventional clamping device configured to use fingers or arms to apply a pressing force toward the end surface of a workpiece.

MODES FOR CARRYING OUT THE INVENTION

A clamping device according to the present invention is described specifically by use of embodiments.

First Embodiment

Figure 1:
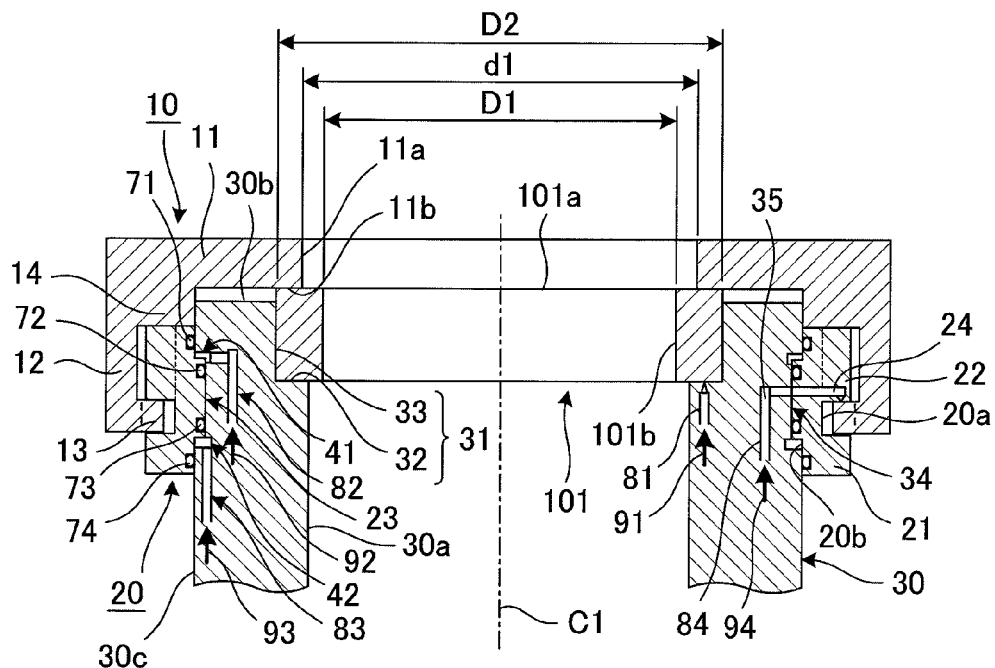
FIG. 1 is a sectional view of a clamping device according to a first embodiment of the present invention.
Figure 2:
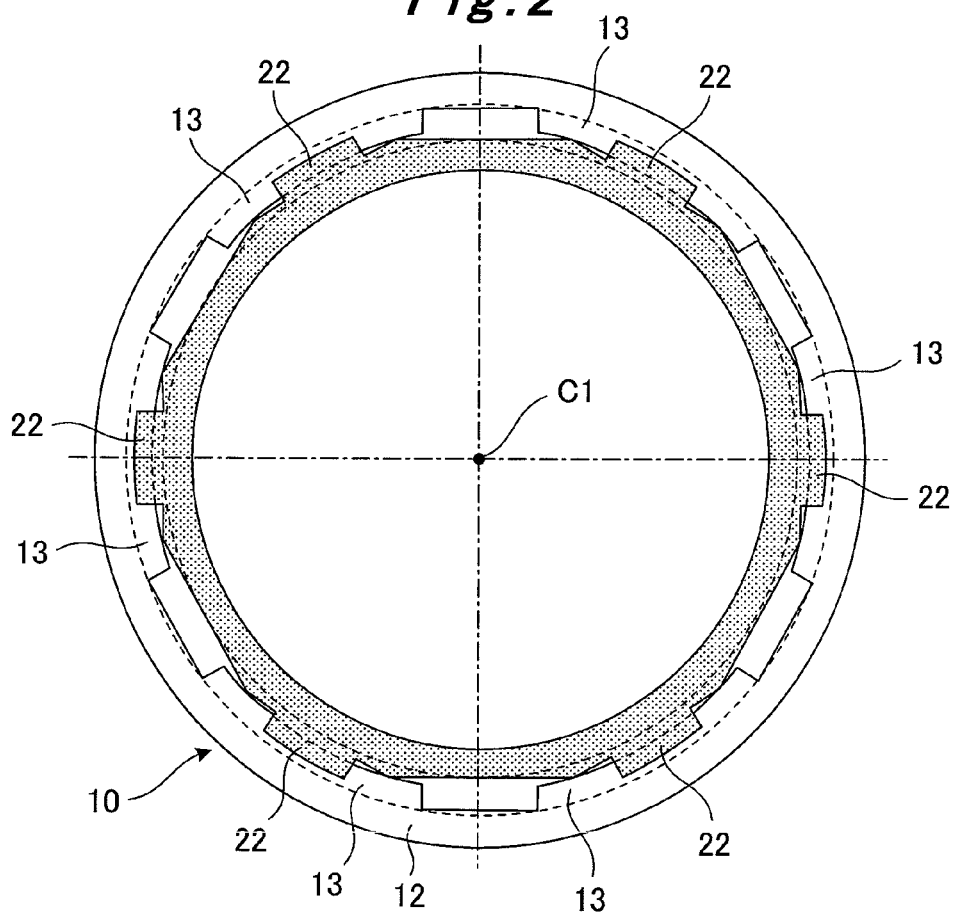
FIG. 2 is a diagram illustrating how a securing member and a pressing-force applying instrument of the clamping device according to the first embodiment of the present invention are coupled to each other.

A clamping device according to a first embodiment of the present invention is described with reference to FIGS. 1 and 2.

The clamping device according to this embodiment is attached to a mount table provided with a reference surface on which centering of a workpiece is performed. As shown in FIG. 1, a mount table 30 has an opening portion 30a provided in its center, and a step portion 31 provided at an edge of the opening portion 30a. The step portion 31 includes a reference surface 32 and a side wall portion 33 being connected to an outer circumferential portion of the reference surface 32 and extending upward. An upper edge of the side wall portion 33 is connected to an upper surface portion 30b of the mount table 30. The step portion 31 is formed into substantially the same size as outer diameter D2 of a workpiece 101, and centering of the workpiece 101 is performed by placing the workpiece 101 in the step portion 31. In other words, the workpiece 101 is placed such that its center axis is coaxial with center axis C1 of the mount table 30. The side wall portion 33 is formed to have a smaller height than the workpiece 101, and an end surface 101a of the workpiece 101 protrudes upward relative to the upper surface portion 30b of the mount table 30 when the workpiece 101 is placed in the step portion 31. Note that gear teeth are formed at an inner circumferential surface 101b of the workpiece 101.

The reference surface 32 of the step portion 31 is provided with first air supply passages 81. The first air supply passages 81 communicate with the reference surface 32 so that the reference surface 32 of the step portion 31 can be supplied with air 91. The multiple first air supply passages 81 are provided at circumferential positions. Whether the workpiece 101 is attached with a predetermined posture or not can be checked by measuring the pressure of air in the first air supply passages 81. This suppresses decrease in the machining accuracy of the workpiece 101.

A clamping device is a device configured to clamp the workpiece 101 placed on the reference surface 32 of the mount table 30. The clamping device has: a securing member 10 having a surface contact portion 11b to be in surface contact with the end surface 101a of the workpiece 101 placed on the reference surface 32 of the mount table 30; and a pressing-force applying instrument (pressing-force applying means) 20 configured to apply a pressing force to the securing member 10 toward the end surface 101a of the workpiece 101.

The securing member 10 has a cylindrical shape with a bottom, and has a disk-shaped bottom plate portion 11 and a cylindrical portion 12 connected to an edge portion of the bottom plate portion 11. An opening portion 11a is provided in the center of the bottom plate portion 11. Diameter d1 of the opening portion 11a is larger than inner diameter D1 of the workpiece 101 and smaller than outer diameter D2 of the workpiece 101. A tip end portion (lower end portion) of the cylindrical portion 12 is provided with claw portions 13 protruding toward the center. The multiple claw portions 13 are provided at predetermined intervals in the circumferential direction of the cylindrical portion 12. A protrusion portion 14 protruding toward the center is formed over the entire circumference of a base end portion of the cylindrical portion 12. As shown in FIGS. 1 and 2, the multiple claw portions 13 and the protrusion portion 14 as well as first and second outer protrusion portions 21, 22 of the pressing-force applying instrument 20 to be described later form a bayonet mechanism, and can be coupled to each other. Thus, the pressing-force applying instrument 20 and the securing member 10 can be moved upward or downward together. When the pressing-force applying instrument 20 moves downward, the securing member 10 also moves downward, bringing the tip end portion (surface contact portion) 11b of the bottom plate portion 11 of the securing member 10 into surface contact with the end surface 101a of the workpiece 101. Thereby, a pressing force is applied to the workpiece 101 toward the mount table 30. When the pressing-force applying instrument 20 moves upward, the securing member 10 also moves upward, making the workpiece 101 unclamped from the mount table 30.

The pressing-force applying instrument 20 has a cylindrical shape, and is attached to an outer circumferential portion 30c of the mount table 30 at a position near the upper surface portion 30b in such a manner as to be movable upward and downward. A first outer protrusion portion 21 protruding radially is formed over the entire circumference of a portion below an outer circumferential portion 20a of the pressing-force applying instrument 20. Multiple second outer protrusion portions 22 protruding radially are formed at circumferential positions above the outer circumferential portion 20a of the pressing-force applying instrument 20. Thus, the securing member 10 and the pressing-force applying instrument 20 can be coupled to each other by the bayonet mechanism, and the securing member 10 can be attached to pressing-force applying instrument 20 easily.

An inner protrusion portion 23 is formed at an inner circumferential portion 20b of the pressing-force applying instrument 20. The inner protrusion portion 23 protrudes toward the center (toward the mount table 30) and can be fitted into a groove portion 34 formed at the outer circumferential portion 30c of the mount table 30. The groove portion 34 of the mount table 30 and the inner protrusion portion 23 of the pressing-force applying instrument 20 form a first hydraulic chamber 41 and a second hydraulic chamber 42. A first hydraulic passage 82 communicating with the first hydraulic chamber 41 is formed in the mount table 30. The pressing-force applying instrument 20 is biased downward when hydraulic oil 92 is supplied to the first hydraulic chamber 41 through the first hydraulic passage 82 by a pump (not shown). Thereby, the securing member 10 is pulled downward, and the surface contact portion 11b of the securing member 10 thus biases the end surface 101a of the workpiece 101 toward the reference surface 32 of the mount table 30. Thus, the workpiece 101 is secured to the reference surface 32 of the mount table 30.

A second hydraulic passage 83 communicating with the second hydraulic chamber 42 is formed in the mount table 30. The pressing-force applying instrument 20 is biased upward when hydraulic oil 93 is supplied to the second hydraulic chamber 42 through the second hydraulic passage 83 by a pump (not shown). Thereby, the securing member 10 is pushed upward, and the force by the surface contact portion 11b of the securing member 10 pressing the end surface 101a of the workpiece 101 toward the reference surface 32 of the mount table 30 is released.

Note that sealing rubbers 71, 72 are arranged in the inner circumferential portion 20b of the pressing-force applying instrument 20 on both sides of the first hydraulic chamber 41, respectively, in order to prevent hydraulic oil 92 from leaking from the first hydraulic chamber 41. Moreover, sealing rubbers 73, 74 are arranged in the inner circumferential portion 20b of the pressing-force applying instrument 20 on both sides of the second hydraulic chamber 42, respectively, in order to prevent hydraulic oil 93 from leaking from the second hydraulic chamber 42.

Second air supply passages 84 are provided through the mount table 30 and the pressing-force applying instrument 20. The second air supply passages 84 each include a communication hole 35 formed in the mount table 30 and an air supply hole 24 formed in the pressing-force applying instrument 20. Note that the communication hole 35 is formed with a larger diameter than the air supply hole 24. For this reason, even when the pressing-force applying instrument 20 moves upward and downward, the communication hole 35 and the air supply hole 24 still communicate with each other, so that air 94 can be supplied to the air supply hole 24 through the communication hole 35. A tip end portion of the air supply hole 24 faces a lower surface portion of the second outer protrusion portion 22. The multiple second air supply passages 84 are provided at circumferential positions in the pressing-force applying instrument 20. Whether the workpiece 101 is attached with a predetermined posture or not can be checked by measuring the air pressure in the second air supply passages 84. Thereby, the securing member 10 can be held securely.

Subsequently, a description is given of operations of the clamping device having the above configuration, or specifically, operations for clamping the workpiece 101 to the mount table 30 and operations for unclamping the workpiece 101.

First, to clamp the workpiece 101 to the mount table 30, the workpiece 101 is placed on the reference surface 32 of the step portion 31 of the mount table 30. Next, the securing member 10 is attached to the pressing-force applying instrument 20. After the securing member 10 is attached to the pressing-force applying instrument 20, hydraulic oil 92 is supplied to the first hydraulic chamber 41 through the first hydraulic passage 82 by a pump. Thereby, the pressing-force applying instrument 20 is biased downward, and the securing member 10 is pulled downward. As a result, the surface contact portion 11b of the securing member 10 biases the end surface 101a of the workpiece 101 toward the reference surface 32 of the mount table 30. Thus, the workpiece 101 is secured to the reference surface 32 of the mount table 30. Here, the posture of the workpiece 101 can be checked by measuring the air pressure in the first air supply passage 81. In addition, the posture of the securing member 10 can be checked by measuring the air pressure in the second air supply passage 84. After confirming that the workpiece 101 and the securing member 10 are arranged with their predetermined postures, a tool (not shown) is inserted into an area surrounded by the inner circumferential surface 101b of the workpiece 101, and the inner circumferential surface 101b of the workpiece 101 is finished.

On the other hand, to unclamp the workpiece 101, the supply of hydraulic oil 92 to the first hydraulic chamber 41 by the pump is stopped, and hydraulic oil 93 is supplied to the second hydraulic chamber 42 through the second hydraulic passage 83 by a pump. Thereby, the pressing-force applying instrument 20 is biased upward, and the securing member 10 is pushed upward. As a result, the force by the surface contact portion 11b of the securing member 10 pressing the end surface 101a of the workpiece 101 toward the reference surface 32 of the mount table 30 is released. Consequently, the workpiece 101 is now merely placed on the reference surface 32 of the mount table 30. In other words, the workpiece 101 is unclamped. In this state, the mount table 30 is turned to detach the securing member 10 from the pressing-force applying instrument 20, and the workpiece 101 is taken out from the step portion 31 of the mount table 30.

As described, in the clamping device according to this embodiment, the securing member 10 has: the opening portion 11a with diameter d1 which is larger than inner diameter D1 of the workpiece 101 and smaller than outer diameter D2 of the workpiece 101; and the surface contact portion 11b to be in surface contact with the end surface 101a of the workpiece 101. During the work, a tool is inserted into the area surrounded by the inner circumferential surface 101b of the workpiece 101. Accordingly, even when the pressing-force applying instrument 20 is broken, the securing member 10 is prevented from flying out. This accomplishes safety improvement. Moreover, since the securing member 10 can apply a pressing force to the entire circumference of the end surface 101a of the workpiece 101 toward the mount table 30, a clamping force for clamping the workpiece 101 to the mount table 30 can be improved, compared to the conventional clamping device configured to use claw portions to apply a pressing force toward the outer circumferential surface of a workpiece or the conventional clamping device configured to use fingers or arms to apply a pressing force toward the end surface of a workpiece.

Second Embodiment

Figure 3:
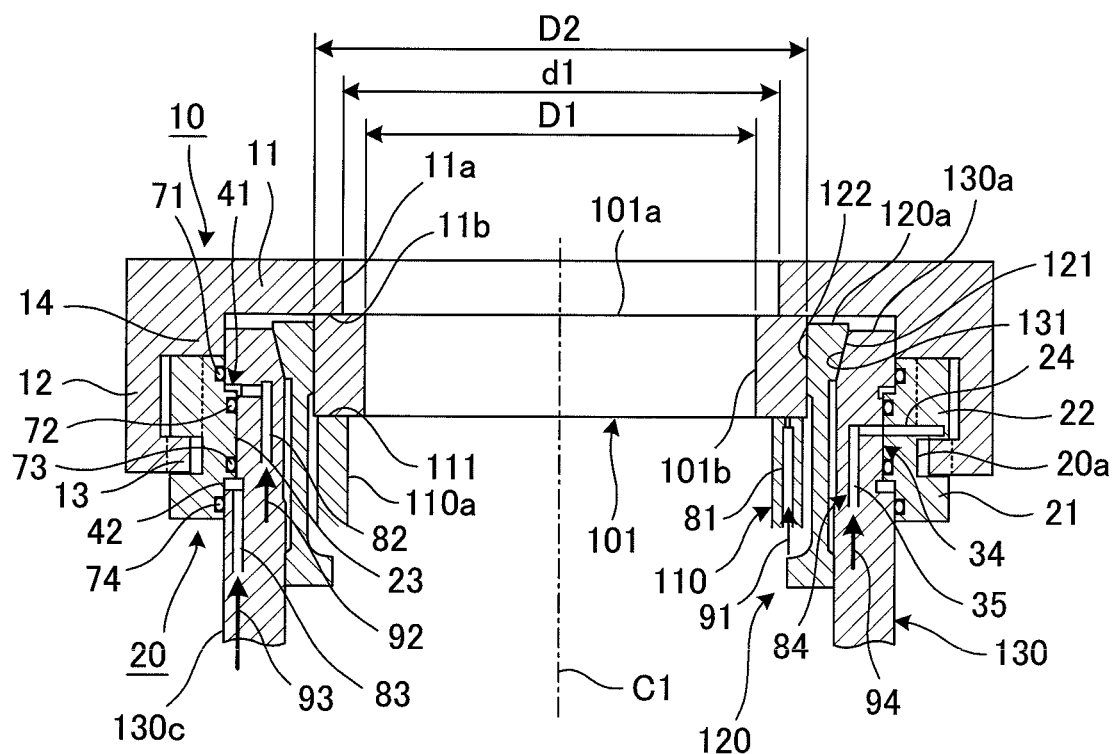
FIG. 3 is a sectional view of a clamping device according to a second embodiment of the present invention.

With reference to FIG. 3, a description is given of a clamping device according to a second embodiment of the present invention. In this embodiment, centering of the workpiece is performed using a guide member and a collet instead of the step portion of the mount table. In this embodiment, the mount table of the clamping device according to the first embodiment described above is alternatively formed by a mount table, a collet, and a guide member, and other instruments are the same as those in the first embodiment. In this embodiment, instruments that are the same as those of the clamping device according to the first embodiment are given the same reference numerals, and are not described again.

In the clamping device according to this embodiment, the workpiece 101 is placed on a reference surface 111 of a mount table 110, as shown in FIG. 3. An opening portion 110a is provided in the center of the mount table 110. The clamping device includes a collet 120 and a guide member 130 which are configured to perform centering of the workpiece 101. The groove portion 34 is formed at an outer circumferential portion 130c of the guide member 130, and the inner protrusion portion 23 of the pressing-force applying instrument 20 is fitted into this groove portion 34. Like the mount table 30 of the clamping device according to the first embodiment described above, the first and second hydraulic chambers 41, 42 are formed. The first and second hydraulic passages 82, 83 are formed to communicate with the first and second hydraulic chambers 41, 42, respectively. Hydraulic oil 92, 93 can be supplied to the first and second hydraulic chambers 41, 42, respectively. The pressing-force applying instrument 20 and the securing member 10 can be coupled to each other using a bayonet mechanism. Thereby, the pressing-force applying instrument 20 and the securing member 10 can move upward and downward together.

An inclination portion 131 increasing in diameter upward is formed at an inner circumferential portion of the guide member 130 at a position near an upper end portion 130a. The collet 120 is placed between the mount table 110 and the guide member 130. The collet 120 can be drawn downward in FIG. 3 by a drawing mechanism (not shown). A tapered portion 121 increasing in diameter upward is formed at an outer circumferential portion of the collet 120 at a position near an upper end portion 120a. A hold portion 122 configured to hold the workpiece 101 placed on the reference surface 111 of the mount table 110 is formed at an inner circumferential portion of the collet 120 at a position near the upper end portion 120a. Thus, when the collet 120 placed between the mount table 110 and the guide member 130 is drawn downward with the workpiece 111 being placed on the reference surface 111 of the mount table 110, a portion near the upper end portion 120a of the collet 120 is forcibly decreased in diameter. Thereby, centering of the workpiece 101 placed on the reference surface 111 of the mount table 110 is performed. By pushing the collet 120 upward, the force decreasing the diameter of the portion near the upper end portion 120a of the collet 120 is released.

Subsequently, descriptions are given of operations of the clamping device having the above-described configuration, or specifically, operations for clamping the workpiece 101 to the mount table 110 and operations for unclamping the workpiece 101.

First, to clamp the workpiece 101, the workpiece 101 is placed on the reference surface 111 of the mount table 110. Then, the collet 120 is placed between the mount table 110 and the guide member 130, and is drawn downward in FIG. 3. Centering of the workpiece 101 is thus performed. The securing member 10 is attached to the pressing-force applying instrument 20. Next, hydraulic oil 92 is supplied to the first hydraulic chamber 41 through the first hydraulic passage 82 by a pump. Thereby, the pressing-force applying instrument 20 is biased downward, and the securing member 10 is pulled downward. As a result, the surface contact portion 11b of the securing member 10 biases the end surface 101a of the workpiece 101 toward the reference surface 111 of the mount table 110. Thus, the workpiece 101 is secured to the reference surface 111 of the mount table 110. In this state, a tool (not shown) is inserted into an area surrounded by the inner circumferential surface 101b of the workpiece 101, and the inner circumferential surface 101b of the workpiece 101 is finished.

On the other hand, to unclamp the workpiece 101, the supply of hydraulic oil 92 to the first hydraulic chamber 41 by the pump is stopped, and hydraulic oil 93 is supplied to the second hydraulic chamber 42 through the second hydraulic passage 83 by a pump. Thereby, the pressing-force applying instrument 20 is biased upward, and the securing member 10 is pushed upward. As a result, the force by the surface contact portion 11b of the securing member 10 pressing the end surface 101a of the workpiece 101 toward the reference surface 111 of the mount table 110 is released. Consequently, the workpiece 101 is now merely placed on the reference surface 111 of the mount table 110. In other words, the workpiece 101 is unclamped. In this state, the mount table 110 is turned to detach the securing member 10 from the pressing-force applying instrument 20, and the workpiece 101 is taken out from the mount table 110.

Thus, according to the clamping device of this embodiment, like the clamping device according to the first embodiment, a clamping force for clamping the workpiece 101 to the mount table 110 can be improved, compared to the conventional clamping device configured to use claw portions to apply a pressing force toward the outer circumferential surface of a workpiece or the conventional clamping device configured to use fingers or arms to apply a pressing force toward the end surface of a workpiece. Moreover, safety improvement can be accomplished.

Third Embodiment

A clamping device according to a third embodiment of the present invention is described with reference to FIGS. 4 and 5. In this embodiment, a transport device configured to transport the securing member is further provided to the clamping device according to the second embodiment described above. In this embodiment, instruments that are the same as those of the clamping device according to the second embodiment are given the same reference numerals, and are not described again.

Figure 4:
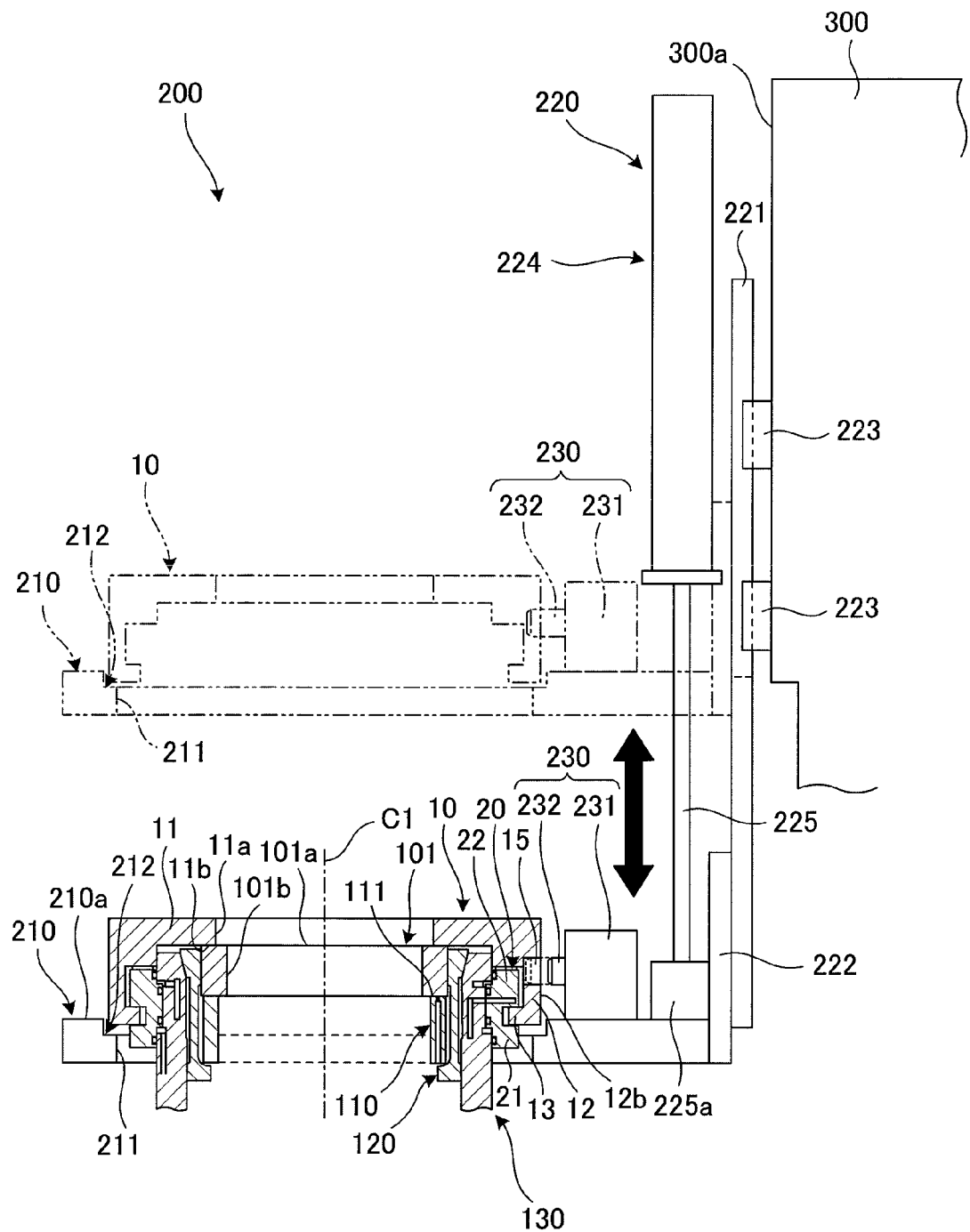
FIG. 4 is a side view of a clamping device according to a third embodiment of the present invention.
Figure 5:
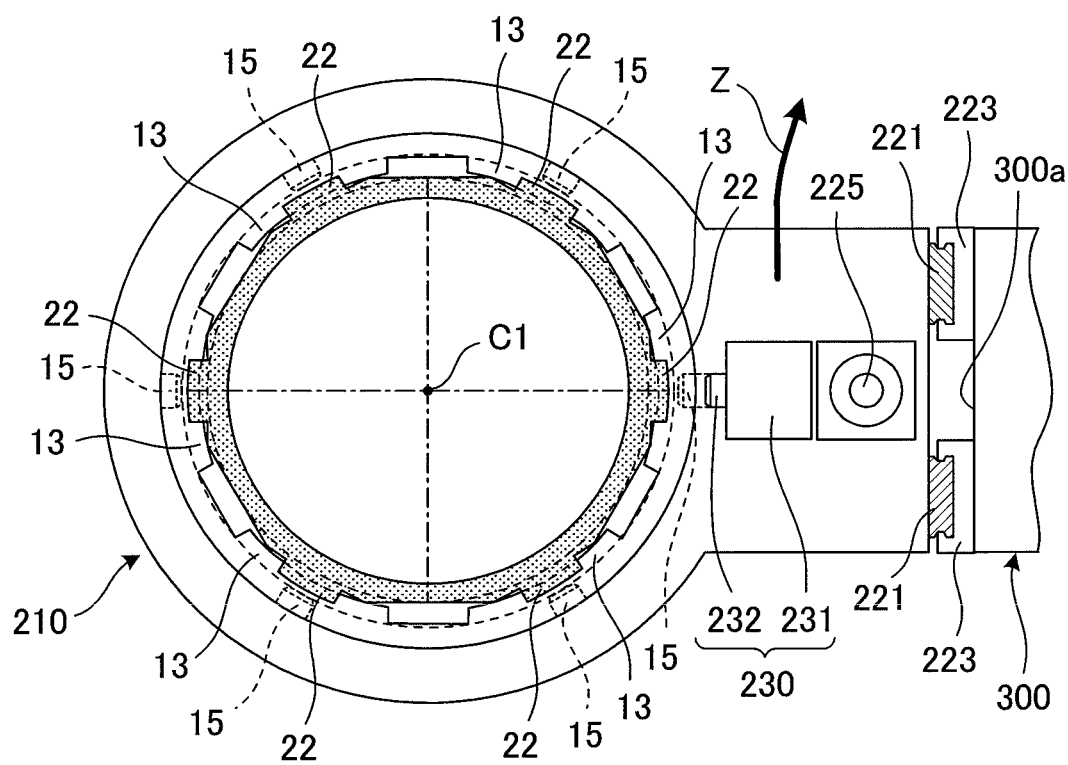
FIG. 5 is a top view of the clamping device according to the third embodiment of the present invention.

As shown in FIGS. 4 and 5, the clamping device according to this embodiment further includes a transport device 200 configured to transport the securing member 10. The transport device 200 has a support table 210 configured to support the securing member 10 and a moving mechanism (moving means) 220 configured to move the support table 210 upward and downward.

The support table 210 is provided with an opening portion 211 and a step portion 212 along the opening portion 211. The opening portion 211 of the support table 210 is formed to allow insertion of the mount table 110, the collet 120, the guide member 130, and the pressing-force applying instrument 20. The step portion 212 is formed to allow the lower end portion of the securing member 10 to be fitted thereinto. Thus, the securing member 10 can be supported at a predetermined position on an upper surface portion 210a of the support table 210.

A phase adjustment mechanism (phase adjustment means) 230 configured to adjust the phase of the securing member 10 is provided to the support table 210 at a position adjacent to the step portion 212. The phase adjustment mechanism 230 includes a cylinder 231 and a piston rod 232 movable toward and away from the securing member 10. A tip end portion of the piston rod 232 is formed into a shape that can be fitted into a recessed portion 15 formed at an outer circumferential portion 12b of the securing member 10. Thus, the phase of the securing member 10 can be adjusted.

The moving mechanism 220 is provided to a front surface portion 300a of a column 300 of a machine tool for machining the workpiece 101. The moving mechanism 220 has: rails 221 extending vertically; brackets 222 configured to secure lower end portions of the rails 221 to a base end portion of the support table 210; sliding portions 223, 223 which are provided to the front surface portion 300a of the column 300 and in which the respective rails 221 are slidable; and a cylinder 224. A piston rod 225 is provided to the cylinder 224 in such a manner as to be capable of advancing and retreating (moving upward and downward). A tip end portion 225a of the piston rod 225 is secured to the support table. The support table 210 moves upward and downward along with the advancing and retreating motion of the piston rod 225. The cylinder 224 is secured to the front surface portion 300a of the column 300 of the machine tool by means of a securing instrument (not shown).

Subsequently, operations for transporting the securing member 10 by the clamping device having the above-described configuration are described.

The workpiece 101 is placed on the reference surface 111 of the mount table 110, and the collet 120 is drawn downward. In other words, the workpiece 101 is placed on the reference surface 111 of the mount table 110 with centering of the workpiece 101 being completed. Subsequently, the column 300 is turned to locate the moving mechanism 220 at a position facing the workpiece 101. That is, the securing member 10 is located above the workpiece 101. Next, the support table 210 is moved downward along the rails 221 by extending the piston rod 225. Then, the mount table 110 is turned to couple the securing member 10 to the pressing-force applying instrument 20. Next, with the piston rod 232 of the phase adjustment mechanism 230 being retracted, and with the piston rod 225 of the moving mechanism 220 being further extended, the support table 210 is moved further downward. In this state, a tool is placed in an area surrounded by the inner circumferential surface 101a of the workpiece 101, and the inner circumferential surface 101a of the workpiece 101 is finished by grinding and the like.

Next, a description is given of operations for withdrawing the securing member 10 after finishing the inner circumferential surface of the workpiece.

First, the tool is moved upward from the area surrounded by the inner circumferential surface 101a of the workpiece 101, so as to withdraw the tool to a position away from the upper area of the workpiece 101. Next, the piston rod 225 of the moving mechanism 220 is retracted to move the support table 210 upward along the rails 221. The step portion 212 of the support table 210 is placed near the lower end portion of the securing member 10. Then, the mount table 110 is turned as necessary. Next, the piston rod 232 of the phase adjustment mechanism 230 is extended to insert the tip end portion of the piston rod 232 to the recessed portion 15 of the securing member 10. After that, the mount table 110 is turned to release the coupling between the securing member 10 and the pressing-force applying instrument 20. Then, the piston rod 225 of the moving mechanism 220 is retracted to move the support table 210 and the securing member 10 upward along the rails 221. The column 300 is turned as necessary. Thus, the securing member 10 is placed at a position away from the position above the workpiece 101.

Thus, according to the clamping device of this embodiment, like the second embodiment described above, a clamping force for clamping the workpiece 101 to the mount table 110 can be improved, compared to the conventional clamping device configured to use claw portions to apply a pressing force toward the outer circumferential surface of a workpiece or the conventional clamping device configured to use fingers or arms to apply a pressing force toward the end surface of a workpiece. Moreover, safety improvement can be accomplished.

Further, since the transport device 200 is included, the securing member 10 can be transported. Accordingly, the securing member 10 can be replaced easily, and the workpiece 101 can be withdrawn. Thus, further safety improvement can be accomplished.

Since the transport device 200 is configured with the support table 210 and the moving mechanism 220, the device is simple as a whole. Thus, increase in facility costs can be suppressed.

By further including the phase adjustment mechanism 230, phase alignment between the securing member 10 and the pressing-force applying instrument 20 can be easily done. Thereby, the work can be performed with high efficiency.

Although the present invention is applied to a clamping device configured to perform centering of the workpiece 101 by using the collet 120 in the above description, the present invention is also applicable to a clamping device configured to perform the workpiece centering by using the reference surface of the step portion provided to the mount table.

INDUSTRIAL APPLICABILITY

The clamping device according to the present invention can improve a clamping force for clamping a workpiece, whose inner circumferential surface is to be machined, to a mount table, and can also improve safety; therefore, the clamping device is beneficial in the machine tool industry and the like.

EXPLANATION OF REFERENCE NUMERALS

10 SECURING MEMBER
11 BOTTOM PLATE PORTION
12 CYLINDER PORTION
13 CLAW PORTION
14 PROTRUSION PORTION
15 RECESSED PORTION
20 PRESSING-FORCE APPLYING INSTRUMENT
21 FIRST OUTER PROTRUSION PORTION
22 SECOND OUTER PROTRUSION PORTION
23 INNER PROTRUSION PORTION
24 AIR SUPPLY OPENING
30 MOUNT TABLE
31 STEP PORTION
32 REFERENCE SURFACE
33 SIDE WALL PORTION
34 GROOVE PORTION
35 COMMUNICATION HOLE

41 FIRST HYDRAULIC CHAMBER
42 SECOND HYDRAULIC CHAMBER
71 TO 74 SEALING RUBBER
81 FIRST AIR SUPPLY PASSAGE
82 FIRST HYDRAULIC PASSAGE
83 SECOND HYDRAULIC PASSAGE
84 SECOND AIR SUPPLY PASSAGE
91, 94 AIR
92, 93 HYDRAULIC OIL
110 MOUNT TABLE
111 REFERENCE SURFACE
120 COLLET
121 TAPERED PORTION
130 GUIDE MEMBER
131 INCLINATION PORTION
200 TRANSPORT DEVICE
210 SUPPORT TABLE
211 OPENING PORTION
212 STEP PORTION
220 MOVING MECHANISM
221 RAIL
222 BRACKET
223 SLIDING PORTION
224 CYLINDER
225 PISTON ROD
230 PHASE ADJUSTMENT MECHANISM
231 CYLINDER
232 PISTON ROD
300 COLUMN OF MACHINE TOOL

The invention claimed is:

1. A clamping device configured to clamp a workpiece placed on a reference surface of a mount table, wherein the clamping device comprises:
   a plate-shaped securing member including a plate portion in which an opening portion is formed and which comes into surface contact with an end surface of the workpiece placed on the reference surface of the mount table, the opening portion being larger than an inner diameter of the workpiece and smaller than an outer diameter of the workpiece; and
   a cylinder-shaped pressing-force applying instrument configured to apply a pressing force to the securing member toward the end surface of the workpiece, the cylinder-shaped pressing-force applying instrument including a cylindrical portion surrounding the mount table, the plate portion of the securing member is larger in diameter than the cylindrical portion of the pressing-force applying instrument,
   the securing member includes
      a cylindrical portion connected to an edge portion of the plate portion, and surrounding the cylindrical portion of the pressing-force applying instrument, and
      a claw portion provided to an inner circumferential portion of the cylindrical portion of the securing member, and protruding toward a center of the cylindrical portion of the securing member,
   the cylinder-shaped pressing-force applying instrument is attached to the mount table, and
   a hydraulic chamber capable of supplying and discharging hydraulic oil is formed by a protrusion portion provided to an inner circumferential portion of the cylinder-shaped pressing-force applying instrument and by a groove portion which is formed at an outer circumferential portion of the mount table and into which the protrusion portion of the cylinder-shaped pressing-force applying instrument is fitted, and
   the claw portion of the securing member, and an outer protrusion portion provided to an outer circumferential portion of the cylinder-shaped pressing-force applying instrument and protruding outward radially are connected together with a bayonet mechanism.

2. The clamping device according to claim 1, wherein the clamping device further comprises a transport device configured to transport the securing member.

3. The clamping device according to claim 2, wherein the transport device includes a support table configured to support the securing member, and a moving mechanism configured to move the support table upward and downward.

4. The clamping device according to claim 3, wherein the clamping device further comprises a phase adjustment mechanism configured to adjust a phase of the securing member, and
the phase adjustment mechanism includes a piston rod provided to the support table, capable of moving toward and away from the securing member, and capable of being fitted into a recessed portion formed at an outer circumferential surface of the securing member.

* * * * *